(12) United States Patent
Wu (10) Patent No.: US 8,836,230 B2
(45) Date of Patent: Sep. 16, 2014

(54) POWER FACTOR CORRECTION CIRCUIT OF AN ELECTRONIC BALLAST

(75) Inventor: Jun Wu, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 81 days.

(21) Appl. No.: 13/521,236

(22) PCT Filed: Dec. 29, 2010

(86) PCT No.: PCT/IB2010/056098
§ 371 (c)(1),
(2), (4) Date: Jul. 10, 2012

(87) PCT Pub. No.: WO2011/086440
PCT Pub. Date: Jul. 21, 2011

(65) Prior Publication Data
US 2013/0127357 A1    May 23, 2013

(30) Foreign Application Priority Data
Jan. 15, 2010    (CN) .......................... 2010 1 0003561

(51) Int. Cl.
*H05B 41/24* (2006.01)
*H02M 1/42* (2007.01)
*H05B 41/28* (2006.01)
*H05B 37/00* (2006.01)

(52) U.S. Cl.
CPC .................. *H05B 37/00* (2013.01); *H02M 1/42* (2013.01); *H05B 41/28* (2013.01)
USPC ............................. 315/247; 315/224; 315/291

(58) Field of Classification Search
USPC .............. 315/200 R, 209 R, 224, 227 R, 244, 315/246–247, 272, 275, 283, 291, 307–308, 315/DIG. 4, DIG. 5, DIG. 7
See application file for complete search history.

(56) References Cited

U.S. PATENT DOCUMENTS

| 5,399,944 | A | 3/1995 | Konopka |  |
|---|---|---|---|---|
| 5,994,848 | A * | 11/1999 | Janczak | ........................ 315/224 |
| 6,169,374 | B1 * | 1/2001 | Chang | ............................ 315/224 |

(Continued)

FOREIGN PATENT DOCUMENTS

| CN | 1753594 A | 3/2006 |
|---|---|---|
| WO | 9930539 A2 | 6/1999 |

OTHER PUBLICATIONS

Mr. Green, EDN China, Nov. 18, 2009.

*Primary Examiner* — Douglas W Owens
*Assistant Examiner* — Henry Luong (57) ABSTRACT

This invention relates to a power factor correction circuit of an electronic ballast. The electronic ballast includes a rectification circuit, a first capacitive element and an inverter. The power factor correction circuit comprises a unidirectional element, an inductive element and a second capacitive element. The unidirectional element is connected in series with the inductive element, and the second capacitive element is connected in parallel with the unidirectional element and the inductive element. A junction of the unidirectional element and the second capacitive element is coupled to a first output terminal of the rectification circuit, a junction of the inductive element and the second capacitive element is coupled to an input terminal of the inverter, and the first capacitive element is coupled between a second output terminal of the rectification circuit and a junction of the unidirectional element and the inductive element.

8 Claims, 6 Drawing Sheets

(56) References Cited

U.S. PATENT DOCUMENTS

| | | |
|---|---|---|
| 6,784,622 B2 | 8/2004 | Newman |
| 7,750,580 B2 * | 7/2010 | Lu et al. .................. 315/247 |
| 2003/0034743 A1 * | 2/2003 | Chen ........................... 315/247 |
| 2007/0057642 A1 | 3/2007 | Pruett |
| 2008/0150447 A1 | 6/2008 | Shackle |

* cited by examiner

POWER FACTOR CORRECTION CIRCUIT OF AN ELECTRONIC BALLAST

FIELD OF THE INVENTION

The invention relates to a power factor correction circuit, in particular a power factor correction circuit of an electronic ballast.

BACKGROUND OF THE INVENTION

The power factor of an AC (alternating current) electric power system is defined as the ratio of the real power to the apparent power, and is a number between 0 and 1. In an electric power system, a load with a low power factor draws more current than a load with a high power factor for the same amount of useful power transferred, and the higher currents increase the energy lost in the distribution system.

Linear loads with a low power factor can be corrected with a passive power factor correction circuit. Non-linear loads, such as rectifiers, distort the current drawn from the electric power system. In such cases, an active or passive power factor correction circuit may be used to counteract the distortion and raise the power factor.

SUMMARY OF THE INVENTION

The inventor of the present invention realizes that there are some special requirements for the design of the power factor correction circuit of an electronic ballast. Firstly, the size of the power factor correction circuit is important. A small size power factor correction circuit enables the electronic ballast to be easily implemented in a small size lamp. In addition, for a dimmable lamp, it would be better if the power correction circuit does not directly affect the current flowing through the burner of the dimmable lamp; otherwise, when the dimmable lamp is dimmed to a low dimming level such as 5%, the dimmable lamp may flicker due to the unsteady current flowing through the burner.

Based on understanding the prior art and issues described above, it would be advantageous to provide a power correction circuit which has a small size and which can increase the power factor of an electronic ballast. It would also be desirable to provide a power correction circuit which enables the dimmable lamp to work at a low dimming level without flickering.

To better address one or more of the above concerns, according to an embodiment of a first aspect of the invention, a power factor correction circuit of an electronic ballast is provided. The electronic ballast includes a rectification circuit for rectifying an AC input voltage, a first capacitive element for smoothing an output voltage from the rectification circuit and an inverter. The power factor correction circuit comprises:

a unidirectional element, an inductive element and a second capacitive element, wherein the unidirectional element is connected in series with the inductive element, the second capacitive element is connected in parallel with the unidirectional element and the inductive element, a junction of the unidirectional element and the second capacitive element is coupled to a first output terminal of the rectification circuit, a junction of the inductive element and the second capacitive element is coupled to an input terminal of the inverter, and the first capacitive element is coupled between a second output terminal of the rectification circuit and a junction of the unidirectional element and the inductive element.

It was found that a power factor correction circuit according to an embodiment of the present invention can increase the power factor of an electronic ballast to a high value such as 0.98, while the size of the power factor correction circuit is small enough to allow it to be implemented in a small size lamp. In addition, because the power factor correction circuit is coupled between the rectification circuit and the inverter, the power factor correction circuit does not directly affect the current flowing through the burner of a dimmable lamp. In this way, the dimmable lamp having the power factor correction circuit can still work well without flickering even if it is dimmed to a low dimming level.

According to an embodiment of a second aspect of the invention, an electronic ballast is provided. The electronic ballast comprises the power factor correction circuit described above.

According to an embodiment of a third aspect of the invention, a lamp is provided. The lamp comprises the electronic ballast described above.

These and other aspects of the invention will be apparent from and elucidated with reference to the embodiments described hereinafter.

DESCRIPTION OF THE DRAWINGS

The above and other objects and features of the present invention will become more apparent from the following detailed description considered in connection with the accompanying drawings, in which:

FIG. 2 (a) and FIG. 2 (b) depict schematic diagrams of operation of a power factor correction circuit in accordance with an embodiment of the invention;

FIG. 3 (a) depicts a schematic diagram of current flowing through an inductor and FIG. 3 (b) depicts a schematic diagram of voltage across the inductor;

FIG. 7 (a) and FIG. 7 (b) depict schematic diagrams of operation of a power factor correction circuit in accordance with another embodiment of the invention;

The same reference numerals are used to denote similar parts throughout the Figures.

DETAILED DESCRIPTION

According to an embodiment of a first aspect of the invention, a power factor correction circuit of an electronic ballast is provided.

The electronic ballast includes a rectification circuit for rectifying an AC input voltage, a first capacitive element for smoothing an output voltage from the rectification circuit and an inverter.

The electronic ballast can be one of many kinds of electronic ballasts, such as a fluorescent lamp electronic ballast, an LED lamp electronic ballast, a compact fluorescent lamp electronic ballast, a cold cathode fluorescent lamp electronic ballast, a dimmable lamp electronic ballast etc. The rectification circuit can convert an AC input voltage from an AC input power source to a DC (Direct Current) voltage, and the rectification circuit can be implemented in many ways, such as a full-wave rectification circuit, a half-wave rectification circuit etc. The first capacitive element produces steady DC from a DC output of the rectification circuit, and the first capacitive element can be implemented in many ways, such an electrolytic capacitor, two capacitors connected in series or in parallel etc. The inverter converts DC to AC, and the inverter can be implemented in many ways, such as a half bridge inverter, a full bridge inverter, a push-pull inverter etc.

The power factor correction circuit comprises a unidirectional element, an inductive element and a second capacitive element. The unidirectional element conducts electric current only in one direction, and the unidirectional element can be implemented in many ways, such as a diode, a thyristor etc. The inductive element tends to resist changes in the current, and the inductive element can be implemented in many ways, such as an I-type inductor, two inductors connected in series or in parallel etc. The second capacitive element can hold an electrical charge, and the second capacitive element can be implemented in many ways, such as a thin-film capacitor, two capacitors connected in series or in parallel etc.

The unidirectional element is connected in series with the inductive element, and the second capacitive element is connected in parallel with the unidirectional element and the inductive element.

A junction of the unidirectional element and the second capacitive element is coupled to a first output terminal of the rectification circuit. The first output terminal of the rectification circuit is one of the terminals through which DC voltage is output by the rectification circuit. Optionally, there can be other elements, such as a resistance, between the first output terminal of the rectification circuit and the junction of the unidirectional element and the second capacitive element.

A junction of the inductive element and the second capacitive element is coupled to an input terminal of the inverter. The input terminal of the inverter is one of the terminals through which DC voltage is input to the inverter. Optionally, there can be other elements, such as a resistance, between the input terminal of the inverter and the junction of the inductive element and the second capacitive element.

The first capacitive element is coupled between a second output terminal of the rectification circuit and a junction of the unidirectional element and the inductive element. The second output terminal of the rectification circuit is one of the terminals through which DC voltage is output by the rectification circuit. Optionally, there can be other elements, such as a resistance, between the first capacitive element and the junction of the unidirectional element and the inductive element.

Figure 1:
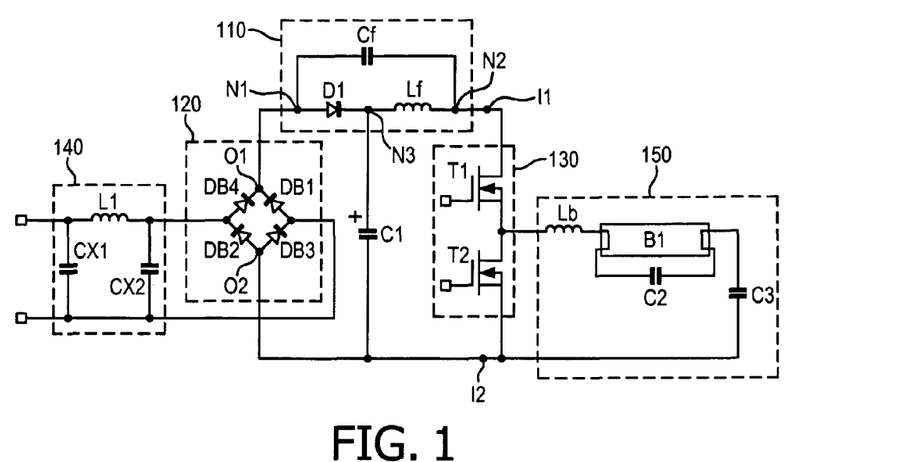
FIG. 1 depicts a schematic diagram of a power factor correction circuit in accordance with an embodiment of the invention.

FIG. 1 depicts a schematic diagram of a power factor correction circuit in accordance with an embodiment of the invention.

Referring to FIG. 1, a power factor correction circuit 110 of an electronic ballast is provided. The electronic ballast includes a full wave rectification circuit 120, an electrolytic capacitor C1 for smoothing an output voltage from the full wave rectification circuit 120 and a half bridge inverter 130. The electronic ballast further includes an input EMI (Electro Magnetic Interference) filter circuit 140 for preventing the EMI from the electric power system to the electronic ballast and an output circuit 150 for providing electronic power to the burner B1.

The power factor correction circuit 110 comprises a diode D1, an inductor Lf and a capacitor Cf. The diode D1 is connected in series with the inductor Lf, and the capacitor Cf is connected in parallel with the diode D1 and the inductor Lf.

A junction N1 of the diode D1 and the capacitor Cf is coupled to a positive output terminal O1 of the full wave rectification circuit 120. The diode D1's anode is coupled to the positive output terminal O1 of the full wave rectification circuit 120. The electric potential of the positive output terminal O1 of the full wave rectification circuit 120 is higher than the electric potential of the negative output terminal O2 of the full wave rectification circuit 120.

A junction N2 of the inductor Lf and the capacitor Cf is coupled to a positive input terminal I1 of the half bridge inverter 130. The electric potential of the positive input terminal I1 of the half bridge inverter 130 is higher than the electric potential of the negative input terminal I2 of the half bridge inverter 130.

The electrolytic capacitor C1 is coupled between a negative output terminal O2 of the full wave rectification circuit 120 and a junction N3 of the diode D1 and the inductor Lf.

Figure 2A:
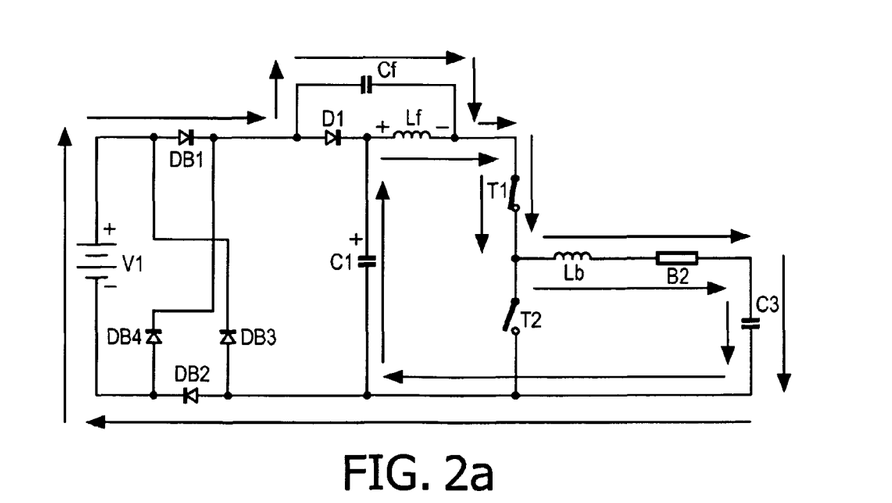
Figure 2B:
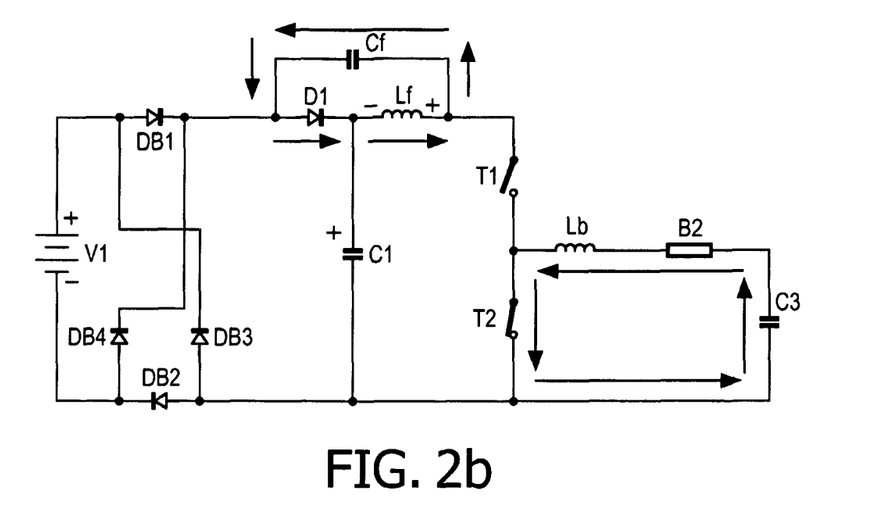

FIG. 2 (a) and FIG. 2 (b) depict schematic diagrams of operation of the power factor correction circuit 110 shown in FIG. 1.

For simplification, MOSFET (Metal Oxide Semiconductor Field Effect Transistor) T1 and T2 are simplified as two ideal switches T1 and T2; and the burner B1 and the capacitor C5 are combined into a load B2. It is known to the person skilled in the art that the switching frequency (e.g. 40 kHz) of switch T1 and switch T2 is much higher than the alternating frequency (e.g. 50 Hz) of the input AC voltage. In addition, if there is no power correction circuit 110, one reason for the low power factor of the electronic ballast is that the operating angle of the diodes DB1 to DB4 of the full wave rectification circuit 120 is small, because the voltage across the electrolytic capacitor C1 is sometimes higher than the input AC voltage. To illustrate the advantages of the power factor correction circuit 110, it is assumed here that the voltage across the electrolytic capacitor C1 is always higher than the input voltage V1.

Figure 3A:
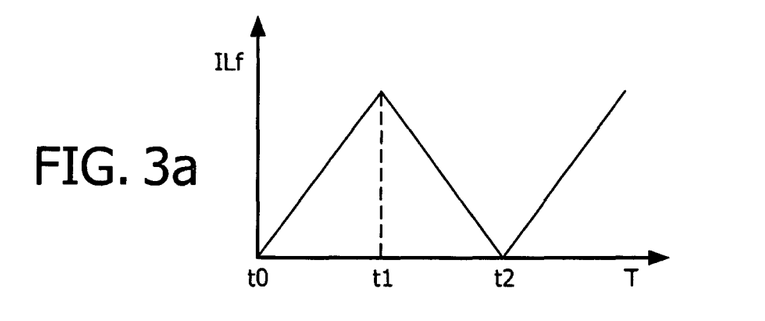
Figure 3B:
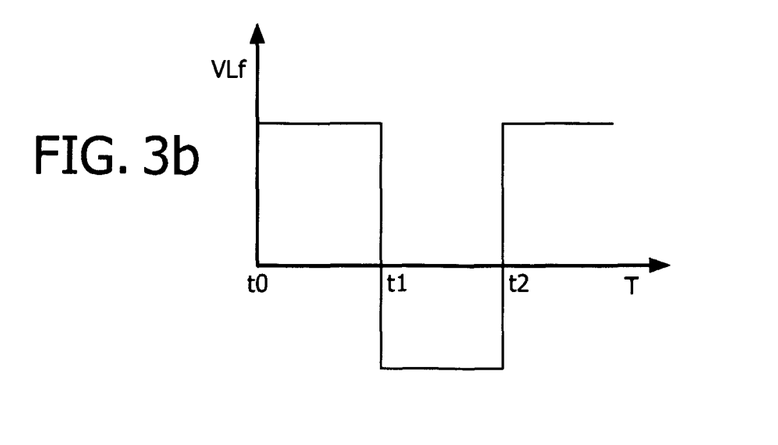
Figure 4:
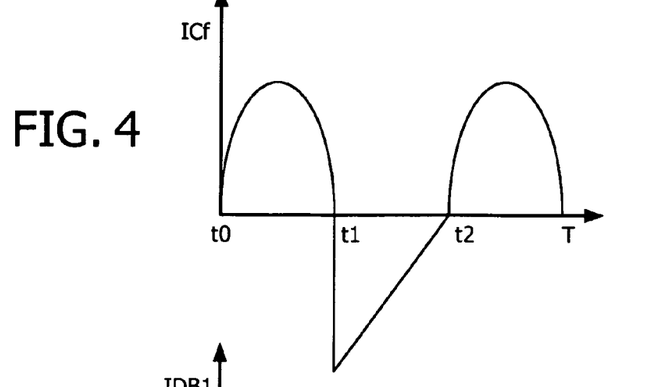
FIG. 4 depicts a schematic diagram of current flowing through a capacitor.
Figure 5:
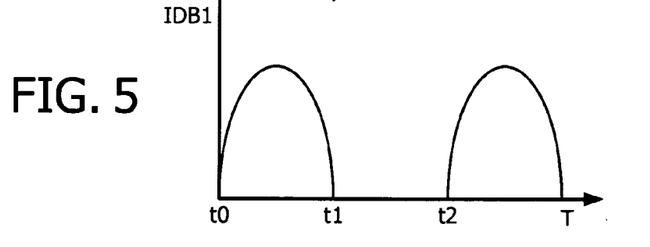
FIG. 5 depicts a schematic diagram of current flowing through a diode in a rectification circuit.

Referring to FIG. 2 (a), in a first period from t0 to t1, the switch T1 is turned on and the switch T2 is turned off. The electrolytic capacitor C1 charges the inductor Lf and provides power to the load B2 via the loop shown herebelow, and the electric potential of the left terminal of the inductor Lf is higher than the electric potential of the right terminal of the inductor Lf:

The voltage across the inductor Lf enables the input voltage V1 to charge the capacitor Cf and provide power to the load B2 via the following loop:

Referring to FIG. 2 (b), after the first period, in a second period from t1 to t2, the switch T1 is turned off and the switch T2 is turned on. The current flowing through the inductor Lf tends to remain unchanged, and then the electric potential of the left terminal of the inductor Lf is lower than the electric potential of the right terminal of the inductor Lf. The inductor Lf and the capacitor Cf discharge respectively via the following loop:

And for the load B2, the corresponding current loop is:

To better explain the operation of the power factor correction circuit 110, corresponding to the above description of operations of the power factor correction circuit 110, current and voltage of some components in the electronic ballast are depicted as shown below. FIG. 3 (a) depicts a schematic diagram of current flowing through the inductor Lf and FIG. 3 (b) depicts a schematic diagram of voltage across the inductor Lf. FIG. 4 depicts a schematic diagram of current flowing through the capacitor Cf. FIG. 5 depicts a schematic diagram of current flowing through the diode DB1 in the full-wave rectification circuit 120.

From t0 to t1, the switch T1 is turned on, the switch T2 is turned off; and from t1 to t2, the switch T1 is turned off, the switch T2 is turned on. As shown in FIG. 3(b), in the first period, the voltage across the inductor Lf enables the input voltage V1 to provide power to the load B2 via the capacitor Cf. As shown in FIG. 5, due to the implementation of the power factor correction circuit 110, there is a current flowing through the diode DB1, even if the voltage across the electrolytic capacitor C1 is higher than the input voltage V1.

In this way, in a period of alternating input AC voltage, the rectification diodes DB1 and DB2 are turned on at a frequency which is the same as the switching frequency of the switches T1 and T2. Therefore, the operating angle of the diodes DB1 and DB2 of the full wave rectification circuit 120 is increased, and the power factor of the electronic ballast is increased by the power factor correction circuit 110.

The above description is about operation of the power factor correction circuit 110 when the diodes DB1 and DB2 are turned on; operation of the power factor correction circuit 110 when the diodes DB3 and DB4 are turned on is similar and is not elaborated here.

The power factor of the electronic ballast can be adjusted from 0.7 to 0.98 by adjusting the capacitance of the capacitor Cf and the inductance of the inductor Lf. In one embodiment, the lamp is 20 W, the inductance of the inductor Lf is 220 uH, the capacitance of the capacitor is 100 nf, and the power factor of the electronic ballast is 0.7. In another embodiment, the lamp is 20 W, the inductance of the inductor Lf is 2.2 mH, the capacitance of the capacitor is 220 nf, and the power factor of the electronic ballast is 0.98. Therefore, a high power factor of the electronic ballast can be achieved by using a low capacitance capacitor and a low inductance inductor, i.e. a capacitor and an inductor having a small size.

Figure 6:
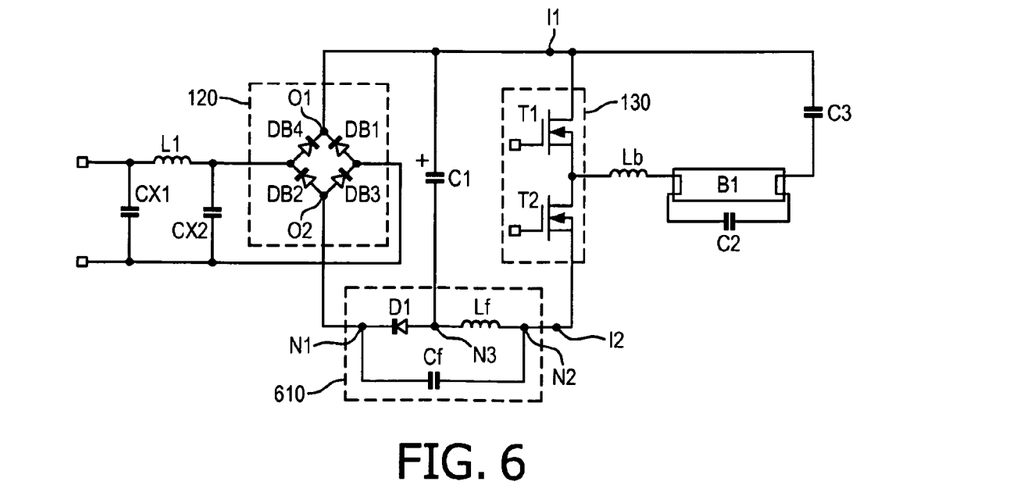
FIG. 6 depicts a schematic diagram of a power factor correction circuit in accordance with another embodiment of the invention.

FIG. 6 depicts a schematic diagram of a power factor correction circuit 610 in accordance with another embodiment of the invention.

Referring to FIG. 6, a power factor correction circuit 610 of an electronic ballast is provided. The electronic ballast includes a full wave rectification circuit 120, an electrolytic capacitor C1 for smoothing an output voltage from the full wave rectification circuit 120 and a half bridge inverter 130.

The power factor correction circuit 610 comprises a diode D1, an inductor Lf and a capacitor Cf. The diode D1 is connected in series with the inductor Lf, and the capacitor Cf is connected in parallel with the diode D1 and the inductor Lf.

A junction N1 of the diode D1 and the capacitor Cf is coupled to a negative output terminal O2 of the full wave rectification circuit 120. The diode D1's cathode is coupled to the negative output terminal O2 of the full wave rectification circuit 120.

A junction N2 of the inductor Lf and the capacitor Cf is coupled to a negative input terminal I2 of the half bridge inverter 130.

The electrolytic capacitor C1 is coupled between a positive output terminal O1 of the full wave rectification circuit 120 and a junction N3 of the diode D1 and the inductor Lf.

Figure 7A:
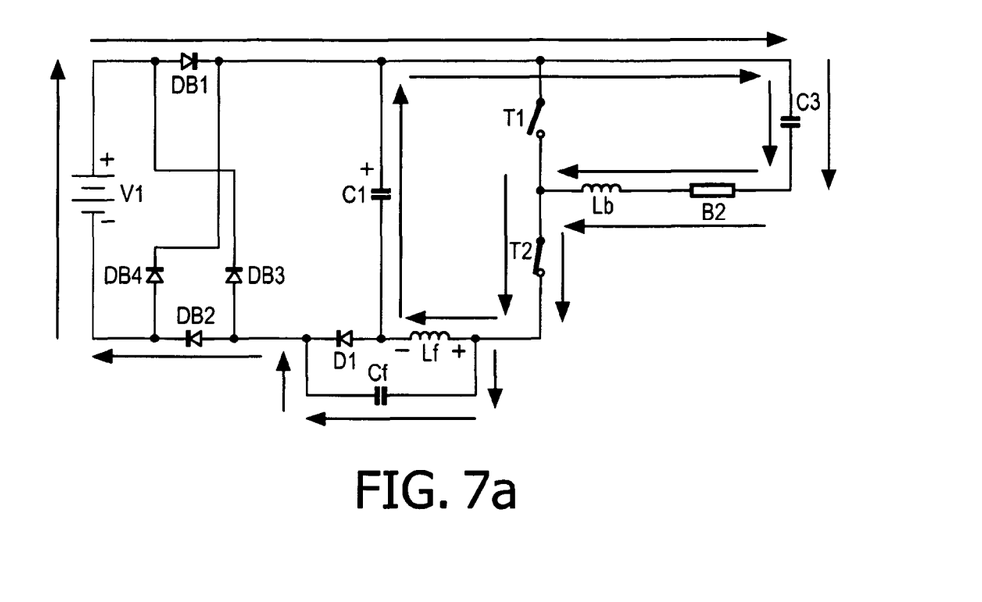
Figure 7B:
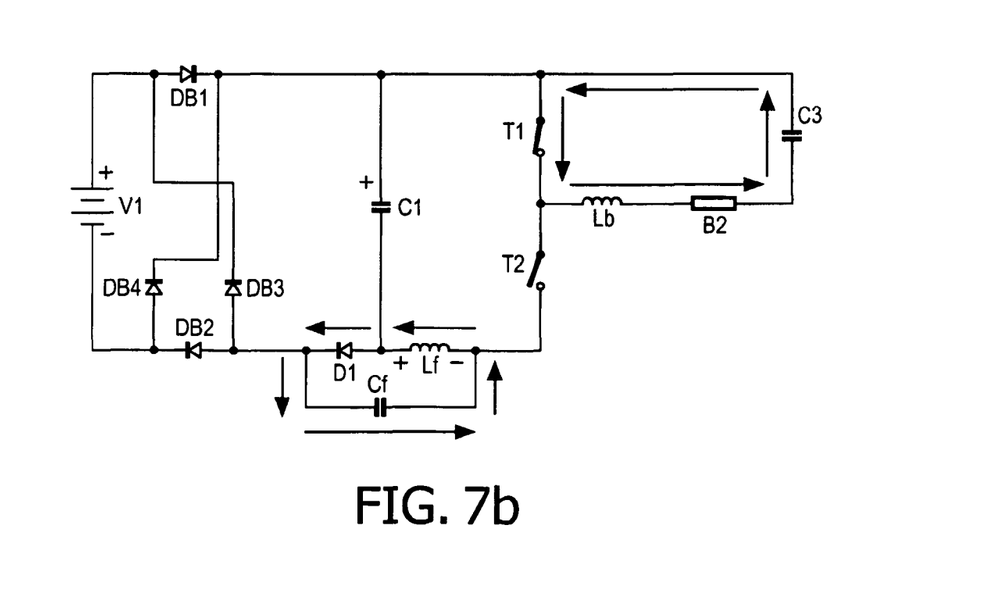

FIG. 7 (a) and FIG. 7 (b) depict schematic diagrams of operation of the power factor correction circuit 610 shown in FIG. 6.

For simplification, MOSFET T1 and T2 are simplified as two ideal switches T1 and T2; and the burner B1 and the capacitor C5 are combined into a load B2. In addition, it is assumed here that the voltage across the electrolytic capacitor C1 is always higher than the input voltage V1.

Referring to FIG. 7 (a), in a first period, the switch T1 is turned off and the switch T2 is turned on. The electrolytic capacitor C1 charges the inductor Lf and provides power to the load B2 via the loop shown herebelow, and the electric potential of the left terminal of the inductor Lf is lower than the electric potential of the right terminal of the inductor Lf:

The voltage across the inductor Lf enables the input voltage V1 to charge the capacitor Cf and provide power to the load B2 via the following loop:

Referring to FIG. 7 (b), in a second period after the first period, the switch T1 is turned on and the switch T2 is turned off. The current flowing through the inductor Lf tends to remain unchanged, and then the electric potential of the left terminal of the inductor Lf is higher than the electric potential of the right terminal of the inductor Lf. The inductor Lf and the capacitor Cf discharge respectively via the following loop:

And for the load B2, the corresponding current loop is:

The above description is about operation of the power factor correction circuit 610 when the diodes DB1 and DB2 are turned on; operation of the power factor correction circuit 610 when the diodes DB3 and DB4 are turned on is similar and is not elaborated here.

Figure 8:
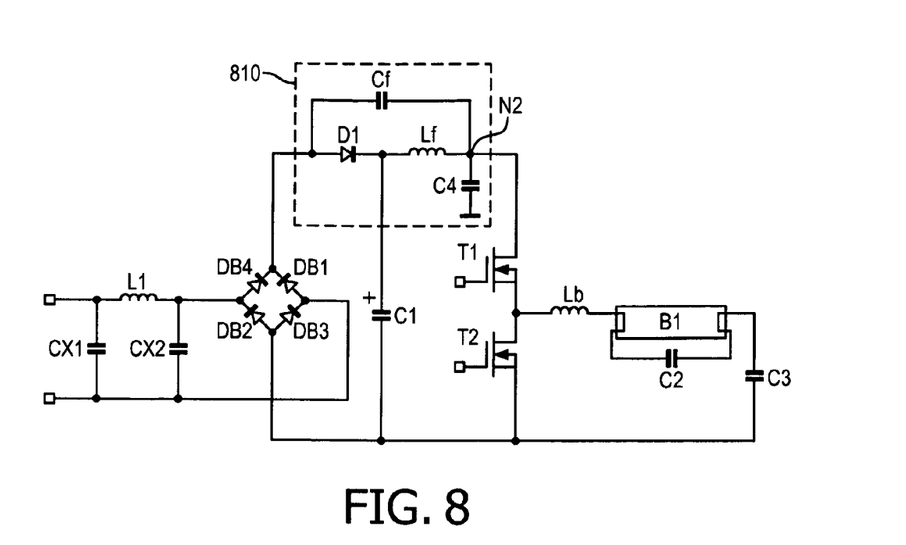
FIG. 8 depicts a schematic diagram of a power factor correction circuit in accordance with a further embodiment of the invention.

FIG. 8 depicts a schematic diagram of a power factor correction circuit 810 in accordance with a further embodiment of the invention.

Referring to FIG. 8, the power factor correction circuit 810 further comprises a third capacitive element C4 coupled between ground of the electronic ballast and a junction N2 of the inductive element Lf and the second capacitive element Cf. The third capacitive element can smooth the current flowing from the power factor correction circuit to the inverter, and the third capacitive element can be implemented in many ways, such as a capacitor C4, two capacitors connected in series or in parallel, etc.

Figure 9:
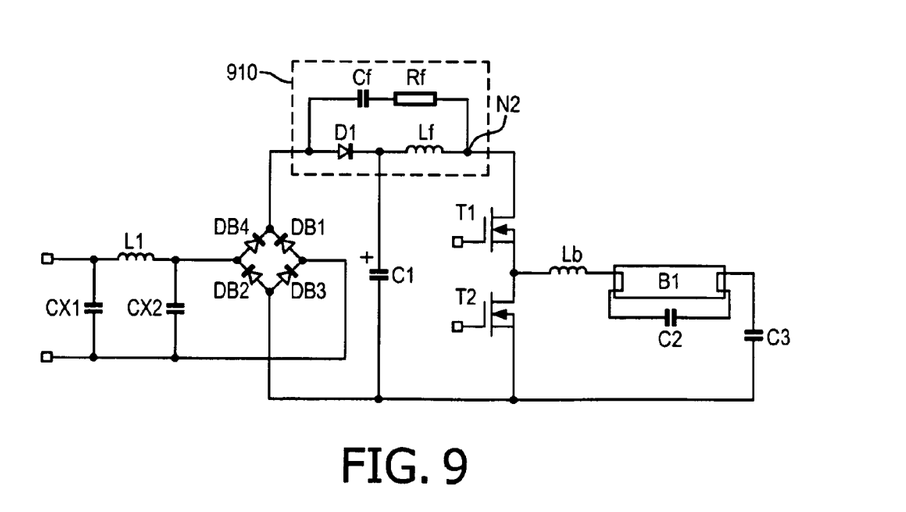
FIG. 9 depicts a schematic diagram of a power factor correction circuit in accordance with a still further embodiment of the invention.

FIG. 9 depicts a schematic diagram of a power factor correction circuit 910 in accordance with a further embodiment of the invention.

Referring to FIG. 9, the power factor correction circuit 910 further comprises a resistive element Rf connected in series with the second capacitive element Cf. The resistive element can decrease rush current flowing through the second capacitive element so as to help suppress EMI. The resistive element can be implemented in many ways, such as a resistor Rf, two resistors connected in series or in parallel, etc.

Figure 10:
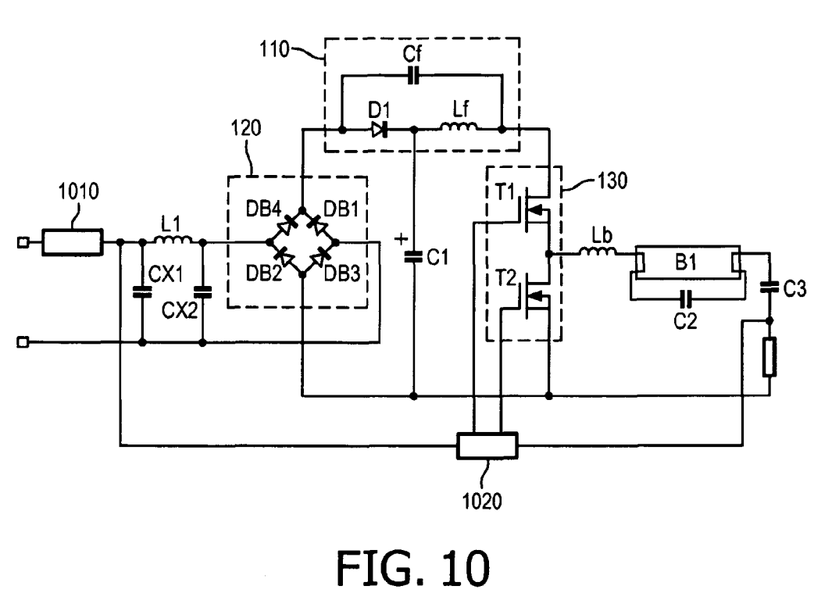
FIG. 10 depicts a schematic diagram of a power factor correction circuit in accordance with an embodiment of the invention.

FIG. 10 depicts a schematic diagram of a power factor correction circuit 110 in accordance with an embodiment of the invention.

Referring to FIG. 10, the electronic ballast is a dimmable lamp electronic ballast and the dimmable lamp electronic ballast comprises a dimmer 1010 and a dimmable lamp electronic ballast driving chip 1020 such as L6574. The user can adjust the dimmer 1010 and then the dimmer 1010 can control the driving chip 1020 to dim the lamp. The dimmable lamp electronic ballast is known to the person skilled in the art and is not elaborated here. As shown in FIG. 10, the power factor correction circuit 110 is coupled between the rectification circuit 120 and the inverter 130; the power factor correction circuit 110 does not directly affect the current flowing through the burner B1. In this way, the dimmable lamp can still work well without flickering even if it is dimmed to a low dimming level.

According to an embodiment of a second aspect of the invention, an electronic ballast is provided. The electronic ballast comprises any power factor correction circuit described above. The electronic ballast can be one of many kinds of electronic ballasts, such as a fluorescent lamp electronic ballast, an LED lamp electronic ballast, a compact fluorescent lamp electronic ballast, a cold cathode fluorescent lamp electronic ballast, a dimmable lamp electronic ballast, etc.

According to an embodiment of a third aspect of the invention, a lamp is provided. The lamp comprises any electronic ballast described above. The lamp can be one of many kinds of lamps, such as a fluorescent lamp, an LED lamp, a compact fluorescent lamp, a cold cathode fluorescent lamp, a dimmable lamp etc. The electronic ballast can be integrated with other components of the lamp or separated from other components of the lamp.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. In the apparatus claims enumerating several units, several of these units can be embodied by one and the same item of hardware or software. The use of the words first, second and third, et cetera, does not indicate any ordering. These words are to be interpreted as names.

The invention claimed is:

1. A power factor correction circuit of an electronic ballast, the electronic ballast including a rectification circuit (120) for rectifying an AC input voltage, a first capacitive element (C1)

for smoothing an output voltage from the rectification circuit (120) and an inverter (130), the power factor correction circuit comprising:

a unidirectional element (D1), an inductive element (Lf) and a second capacitive element (Cf), wherein the unidirectional element (D1) is connected in series with the inductive element (Lf), the second capacitive element (Cf) is connected in parallel with the unidirectional element (D1) and the inductive element (Lf) and coupled to junction (N1) of the of the unidirectional element (D1) and junction (N2) of the inductive element (Lf), the junction (N1) of the unidirectional element (D1) and the second capacitive element (Cf) is coupled to a first output terminal (O1, O2) of the rectification circuit (120), the junction (N2) of the inductive element (Lf) and the second capacitive element (Cf) is coupled to an input terminal (I1, I2) of the inverter (130), and the first capacitive element (C1) is coupled between a second output terminal (O1, O2) of the rectification circuit (120) and a junction (N3) of the unidirectional element (D1) and the inductive element (Lf).

2. A power factor correction circuit as claimed in claim 1, further comprising a third capacitive element (C4) coupled between ground of the electronic ballast and the junction (N2) of the inductive element (Lf) and the second capacitive element (Cf).

3. A power factor correction circuit as claimed in claim 1, further comprising a resistive element (Rf) connected in series with the second capacitive element (Cf).

4. A power factor correction circuit as claimed in claim 1, wherein the unidirectional element (D1) is a diode (D1) having an anode coupled to the first output terminal (O1) of the rectification circuit (120), the first output terminal (O1) of the rectification circuit (120) is a positive output terminal (O1) of the rectification circuit (120), and the input terminal (I1) of the inverter (130) is a positive input terminal (I1) of the inverter (130).

5. A power factor correction circuit as claimed in claim 1, wherein the unidirectional element (D1) is a diode (D1) having a cathode coupled to the first output terminal (O2) of the rectification circuit (120), the first output terminal (O2) of the rectification circuit (120) is a negative output terminal (O2) of the rectification circuit (120), and the input terminal (I2) of the inverter (130) is a negative input terminal (I2) of the inverter (130).

6. An electronic ballast comprising a power factor correction circuit as claimed in claim 1.

7. A lamp comprising an electronic ballast as claimed in claim 6.

8. The power factor correction circuit a claimed in claim 1, wherein the coupling of junction (N2) to the input terminal (I1, I2) of the inverter (130) does not directly affect current flowing through a lamp.

* * * * *